(12) United States Patent
Klein

(10) Patent No.: US 8,324,864 B2
(45) Date of Patent: Dec. 4, 2012

(54) BATTERY FAST CHARGING CURRENT CONTROL ALGORITHM

(75) Inventor: Dale F. Klein, Hartland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 304 days.

(21) Appl. No.: 12/857,955

(22) Filed: Aug. 17, 2010

(65) Prior Publication Data

US 2012/0043934 A1    Feb. 23, 2012

(51) Int. Cl.
*H01M 10/46* (2006.01)
(52) U.S. Cl. ............................................. 320/125
(58) Field of Classification Search .............. 320/107, 320/125, 128, 137, 160
See application file for complete search history.

(56) References Cited

U.S. PATENT DOCUMENTS

| 2005/0024016 A1* | 2/2005 | Breen et al. ............... 320/128 |
| 2005/0275372 A1* | 12/2005 | Crowell ..................... 320/112 |
| 2009/0115376 A1* | 5/2009 | Takeuchi .................... 320/157 |

* cited by examiner

*Primary Examiner* — Edward Tso
(74) *Attorney, Agent, or Firm* — John A. Miller; Miller IP Group, PLC

(57) ABSTRACT

A method for charging a battery. The method includes providing a desired target charge current and measuring the battery current, and determining if the target charge current is less than the measured battery current. The method also includes enabling a current integrator if the target charge current is less than the measured battery current, and integrating a charge current value over time if the current integrator is enabled to provide an integrated charge current value. The method also includes providing a target charge voltage and measuring the battery voltage, and determining if the target charge voltage is less than the measured battery voltage. The method also includes enabling a voltage integrator if the target charge voltage is less than the measured battery voltage, and integrating a charge voltage value over time if the voltage integrator is enabled to provide an integrated voltage value.

20 Claims, 1 Drawing Sheet

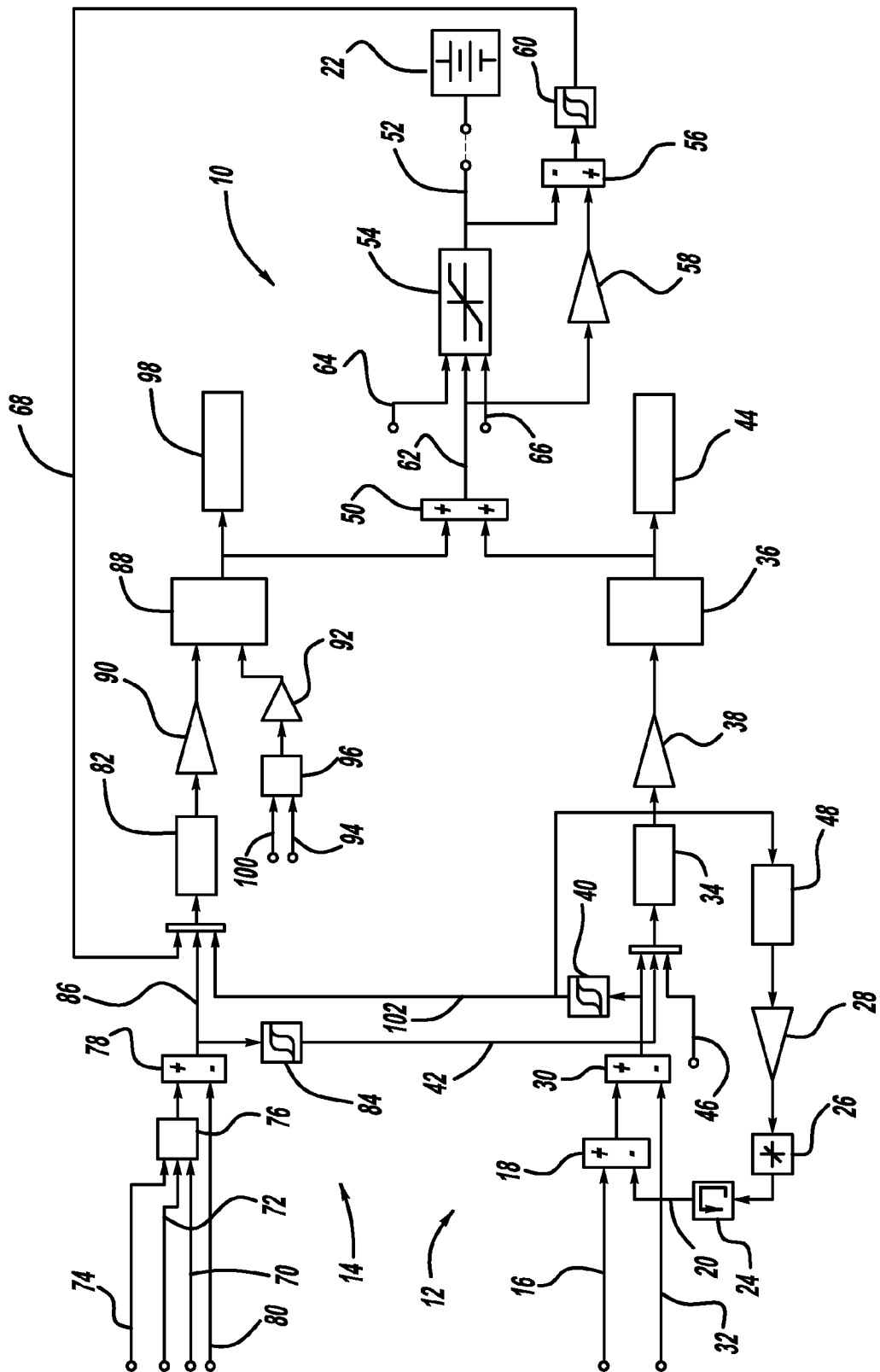

BATTERY FAST CHARGING CURRENT CONTROL ALGORITHM

BACKGROUND OF THE INVENTION

1. Field of the Invention

This invention relates generally to a system and method for charging a battery and, more particularly, to a system and method for charging a vehicle battery that employs both a voltage control mode and a current control mode.

2. Discussion of the Related Art

Electric vehicles are becoming more and more prevalent. These vehicles include hybrid vehicles, such as the extended range electric vehicles (EREV) that combine a battery and a main power source, such as an internal combustion engine, fuel cell system, etc., and electric only vehicles, such as the battery electric vehicles (BEV). All of these types of electric vehicles employ a high voltage battery that includes a number of battery cells. These batteries can be different battery types, such as lithium-ion, nickel metal hydride, lead acid, etc. A typical high voltage battery for an electric vehicle may include 196 battery cells providing about 400 volts. The battery can include individual battery modules where each battery module may include a certain number of battery cells, such as twelve cells. The individual battery cells may be electrically coupled in series, or a series of cells may be electrically coupled in parallel, where a number of cells in the module are connected in series and each module is electrically coupled to the other modules in parallel. Different vehicle designs include different battery designs that employ various trade-offs and advantages for a particular application.

There is a need in the art to reliably charge batteries, particularly vehicle batteries, to accurately and reliably provide a full battery charge without damaging the battery. Currently, battery charging algorithms may attempt to charge the battery to a particular battery voltage within a certain period of time. Once the battery is charged to that voltage level, then the charging algorithm may go into a sustaining charging mode, where a trickle current is provided to maintain the battery at the charge voltage. The algorithms that control the battery charger would need to control the amount of current being provided to the battery to control heat, over-charging, etc., so that the battery and other components would not be damaged. These different types of chargers have different goals where they may be over-night chargers or fast chargers depending on the charging situation. The battery charger may be on the vehicle or may be separate from the vehicle where an electrical cord from the battery charger is plugged into the vehicle or the vehicle is plugged directly into an AC wall outlet.

SUMMARY OF THE INVENTION

In accordance with the teachings of the present invention, a system and method are disclosed for charging a battery where the method employs an algorithm that determines the charger output current that provides the desired current and voltage profile. The method includes providing a desired target charge current and measuring the battery current, and determining if the target charge current is less than the measured battery current. The method also includes enabling a current integrator if the target charge current is less than the measured battery current, and integrating a charge current value over time if the current integrator is enabled to provide an integrated charge current value. The method also includes providing a target charge voltage and measuring the battery voltage, and determining if the target charge voltage is less than the measured battery voltage. The method also includes enabling a voltage integrator if the target charge voltage is less than the measured battery voltage, and integrating a charge voltage value over time if the voltage integrator is enabled to provide an integrated voltage value. The method adds the integrated charge current value and the integrated charge voltage value to provide a charge current command that is used to charge the battery. The method disables the current integrator if the charging operation is in a voltage control mode where the voltage integrator is in enabled and disables the voltage integrator if the charging operation is in a current control mode where the current integrator is enabled.

Additional features of the present invention will become apparent from the following description and appended claims, taken in conjunction with the accompanying drawings.

BRIEF DESCRIPTION OF THE DRAWING

FIG. 1 is a schematic block diagram for an algorithm employed in a system and method for charging a battery.

DETAILED DESCRIPTION OF THE EMBODIMENTS

The following discussion of the embodiments of the invention directed to a system and method for charging a battery is merely exemplary in nature, and is in no way intended to limit the invention or its applications or uses. For example, the battery charging technique of the present invention has particular application for charging a high voltage vehicle battery. However, as well be appreciated by those skilled in the art, the present invention has application for charging other types of batteries.

FIG. 1 is a schematic block diagram illustrating a flow sequence for an algorithm employed in a controller 10 of a battery charger. The controller 10 includes a voltage control mode portion 12 and a current control mode portion 14 that separately control charging of a battery 22. The voltage control mode portion 12 employs voltage control where a desired or charging target voltage on line 16, such as from a look-up table, is applied to a positive terminal of a summation block 18 and an offset target voltage on line 20 is applied to a negative terminal of the summation block 18. The offset target voltage is subtracted from the target voltage in the block 18 to reduce the target voltage and prevent target voltage over-shoot, i.e., exceeding the target voltage on the line 16. In other words, in order to prevent the battery voltage from exceeding the target voltage during a charging sequence when the voltage control mode is entered, the controller 10 employs target over-shoot protection by reducing the target voltage using the summation block 18. The target voltage is modified when the controller 10 is not in the voltage control mode, and transitions to the actual target voltage when the voltage control becomes active.

The offset target voltage is delayed one or more time periods by a delay box 24 so that it reduces the target voltage based on the previous target voltage. A rate limiter circuit 26 subtracts the target voltage offset from a rate limiter value determined by a gain circuit 28 that ramps the offset in/out on transitions in and out of the voltage control. If the measured battery voltage is not less than the target voltage, then the rate limiter circuit 26 prevents the target over-shoot control. The ramp causes the target offset to become closer to the actual target voltage as the battery 22 is being charged. The algorithm sets the offset and ramp out time based on the size and duration of a typical voltage over-shoot, offset and ramp out time, which can be functions of the battery current, state-of-charge, state-of-health, etc. The ramp out rate may be determined dynamically based on the battery voltage and the actual offset target voltages in order to compensate for changes in battery response as the battery state-of-health changes over time. The offset may also be a function of a voltage integrator gain, discussed below.

The modified target voltage from the summation block 18 is sent to the positive terminal of a comparator 30 and the measured battery voltage on line 32 is sent to the negative terminal of the comparator 30. The difference between the target voltage compensated for target voltage over-shoot and the measured battery voltage from the comparator 30 is sent to one input of a voltage integrator enable circuit 34 that enables a voltage integrator 36, discussed in more detail below, so that if the measured voltage is less than the modified target voltage, battery charging using the voltage control mode can be enabled. The signal from the comparator 30 also activates a voltage trip detector circuit 40 that disables a current integrator 88, discussed below, in the current control mode portion 14 on line 102. When the trip detector circuit 40 is activated, the signal on the line 102 is also sent to a circuit 48 that disables the target voltage offset and starts the ramp out of the voltage offset in the rate limiter circuit 26. Another input to the integrator enable circuit 34 is a disabling input on line 42 that disables the voltage integrator 36 if the current integrator 88 is enabled, as will also be discussed in detail below. A third input on line 46 provided to the integrator enable circuit 34 enables or disables the integrator 36 depending on whether the controller 10 is operational, i.e., whether charging is completed to the desired level of state-of-charge, electrical energy, cost, etc.

Once the voltage integrator 36 is enabled as determined by the inputs to the enable circuit 34, the voltage integrator 36 integrates a value based on a gain from a gain circuit 38. The voltage integrator 36 operates to decrease the charging current provided by the charger if the voltage is too high where the current integrator 88 in the current control mode side 14 operates to increase the current provided to the battery 22 during charging. The amount of integration provided by the voltage integrator 36 for the voltage control mode can be displayed on a display device 44.

The amount of voltage provided by the voltage integrator 36 is sent to an adder 50 along with the integration of the current from the current control mode side 14, which will be discussed below. The added integrated charging current from the voltage control mode side 12 and the current control mode side 14 is provided on line 62 to a current limiting circuit 54 that limits the amount of charging current that is able to be provided to the battery 22 for charging purposes on line 52. The signal on the line 52 is a command for the HVDC charger to deliver the amount of charging current to the battery 22. The current limiting circuit 54 receives an upper maximum supply current signal on line 64 and a minimum current, typically zero, on line 66 for the maximum current calculation. It is undesirable for the current integrator 88 in the current mode side 14 to continue to ask for more charging current than what would exceed the ability of the current limiter circuit 54 to provide because it would result in causing the integrator 88 to "wind-up," and would prevent an immediate decrease of the current on the line 62 upon entry to the voltage control mode. Therefore, to prevent integrator wind-up, the control signal on the line 52 is provided to a negative terminal of a comparator 56 and the charging signal on the line 62 is provided to the positive terminal of the comparator 56 through a gain circuit 58, which may be set at a gain of one. Therefore, if the current limiter circuit 54 activates and sets the maximum charging current on the line 52, an increase in additional current on the line 62 will be detected by a detector circuit 60, which will detect saturation of the charger output. The saturation may be a function of time, grid power cost and availability, charger temperature, etc. The detector 60 provides a signal on line 68 that disables the current integrator 88, as will be discussed in further detail below.

In the current control mode portion 14, the desired or target current for charging the battery 22 is the minimum of three separate target values that go to various criteria, such as charging speed, battery power limits, maximum current, etc. Particularly, a desired battery current is provided on line 70, a maximum battery power is provided on line 72 and a maximum battery current is provided on line 74 from appropriate look-up tables or the like. A minimum value detector circuit 76 determines which of the three target currents is the lowest and selects that current as the value that will be compared to the measured battery current on line 80 in a comparator 78. If the minimum target current is less than the measured battery current during the charging operation, then a current integration enable signal is provided on line 86 to a current integrator enable circuit 82 that enables the current integrator 88. The enable signal is also provided to a current trip detector circuit 84 that provides a signal on the line 42 to disable the voltage integrator 36, as discussed above, when the current integrator 88 is enabled. The disable signal on the line 102 when the voltage integrator 36 is enabled is one of the inputs to the current integrator enable circuit 82. A third input to the current integrator enable circuit 82 is on the line 68 from the saturation detector circuit 60. When the voltage is being integrated by the voltage integrator 36, then the voltage trip circuit 40 disables the current integrator 88 and when the current is being integrated by the current integrator 88, the current trip circuit 84 disables the voltage integrator 36.

Disabling the voltage integrator 36 when in the current control mode prevents the voltage integrator 36 from changing its contribution to the adder 50, which allows the current control integrator 88 to have immediate and solitary effect on the charge current on the line 62. Otherwise, the voltage integrator 36 would supply an increasing term to the adder 50, causing the current to overshoot. Disabling the current integrator 88 when in the voltage control mode prevents the current integrator 88 from changing its contribution to the adder 50, which allows the voltage control integrator 36 to have immediate and solitary effect on the charge current on the line 62. Otherwise, the current integrator 88 would supply an increasing term to the adder 50, cancelling out some portion of the voltage control integrator decreasing term, and causing the voltage to overshoot. These voltage and current anti-wind-up features improves the control stability and response following the transitions between the voltage and current control modes. Thus, the enabling criteria for the circuit 82 for enabling the current integrator 88 includes whether the battery current is below the minimum target value, the controller 10 is currently not in the voltage control mode and the charge current is not saturated.

The integrator enable circuit 82 enables the current integrator 88 through a gain circuit 90, which may be set to a gain of one in one example. The current integrator 88 may start at some percentage of the maximum current available to charge, which is set by a gain circuit 92 and provided to the current integrator 88. That value may be determined by the maximum current supplied by the charger on line 100 or the maximum battery current available on line 94 where the minimum of these two values is selected by a minimum circuit 96. The integration of the current by the current integration 88 can be displayed on a display device 98. As mentioned above, the current integrated by the current integrator 88 is added to the voltage integration in the adder 50.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling charging of a battery, said method comprising:
   providing a target charge current;
   measuring battery current;
   determining if the target charge current is less than the measured battery current;
   enabling a current integrator if the target charge current is less than the measured battery current;
   integrating a charge current value over time if the current integrator is enabled to provide an integrated charge current value;
   providing a target charge voltage;
   measuring battery voltage;
   determining if the target charge voltage is less than the measured battery voltage;
   enabling a voltage integrator if the target charge voltage is less than the measured battery voltage;
   integrating a charge voltage value over time if the voltage integrator is enabled; and
   adding the integrated charge current value and the integrated charge voltage value to provide a charge current value that is used to charge the battery.

2. The method according to claim 1 further comprising disabling the current integrator if the charging operation is in a voltage control mode where the voltage integrator is enabled.

3. The method according to claim 1 further comprising disabling the voltage integrator if the charging operation is in a current control mode where the current integrator is enabled.

4. The method according to claim 1 wherein providing a target charge current includes selecting a minimum target charge current value from a maximum battery current, a battery power limit and a predetermined target current.

5. The method according to claim 1 wherein providing a target charge voltage includes providing a modified target voltage that is a desired target voltage minus an offset target voltage that prevents target voltage over-shoot.

6. The method according to claim 5 further comprising ramping the offset target voltage for in and out on transitions and for in and out of voltage control.

7. The method according to claim 1 further comprising detecting whether the charge current value will cause saturation of a charge current.

8. The method according to claim 7 further comprising disabling the current integrator if the charge current is saturated.

9. The method according to claim 1 wherein integrating a charge current value includes beginning the current integration at a predetermined value that is a percentage of a maximum current value that is available for charging.

10. The method according to claim 9 wherein the maximum current value is the minimum of a maximum supply current available to charge the battery and a maximum battery current.

11. The method according to claim 1 wherein the battery is a vehicle battery.

12. A method for controlling charging of a vehicle battery, said method comprising:
    providing a desired target charge current;
    measuring battery current;
    determining if the target charge current is less than the measured battery current;
    enabling a current integrator if the target charge current is less than the measured battery current;
    integrating a charge current value over time if the current integrator is enabled to provide an integrated charge current value;
    providing a target charge voltage;
    measuring the battery voltage;
    determining that the target charge voltage is less than the measured battery voltage;
    enabling a voltage integrator if the target charge voltage is less than the measured battery voltage;
    integrating a charge voltage value over time if the voltage integrator is enabled to provide an integrated charged voltage value;
    adding the integrated charge current value and the integrated charge voltage value to provide a charge current value that is used to charge the battery;
    disabling the current integrator if the charging operation is in voltage control mode where the voltage integrator is enabled;
    disabling the voltage integrator if the charging operation is in a current control mode where the current integrator is enabled; and
    disabling the current integrator if the charging current is saturated.

13. The method according to claim 12 wherein providing a target charge current includes selecting a minimum target charge current value from a maximum battery current, a battery power limit and a predetermined target current.

14. The method according to claim 12 wherein providing a target charge voltage includes providing a modified target voltage that is a desired target voltage minus an offset target voltage that prevents target voltage over-shoot.

15. The method according to claim 12 wherein integrating a charge current value includes beginning the current integration at a predetermined value that is a percentage of a maximum current value that is available to charge.

16. The method according to claim 15 wherein the maximum current value is the minimum of a maximum supply current available to charge the battery or a maximum battery current.

17. A system for controlling charging of a battery, said system comprising:
    means for providing a target charge current;
    means for measuring battery current;
    means for determining if the target charge current is less than the measured battery current;
    means for enabling a current integrator if the target charge current is less than the measured battery current;
    means for integrating a charge current value over time if the current integrator is enabled to provide an integrated charge current value;
    means for providing a target charge voltage;
    means for measuring the battery voltage;
    means for determining if the target charge voltage is less than the measured battery voltage;
    means for integrating a charge voltage value over time if the voltage integrator is enabled; and
    means for adding the integrated charge current value and the integrated charge voltage value to provide a charge current value that is used to charge the battery.

18. The system according to claim 17 further comprising means for disabling the current integrator if the charging operation is in a voltage control mode where the voltage integrator is enabled and means for disabling the voltage integrator if the charging operation is in a current control mode where the current integrator is enabled.

19. The system according to claim 17 wherein the means for providing a target charge current selects a minimum target charge current value from a maximum battery current, a battery power limit and a predetermined target current.

20. The system according to claim 17 wherein the means for providing a target charge voltage provides a modified target voltage that is a desired target voltage minus an offset target voltage that prevents target voltage over-shoot.

* * * * *